United States Patent [19]

Nishiguchi

[11] Patent Number: 5,098,567
[45] Date of Patent: Mar. 24, 1992

[54] WASTE WATER TREATING PROCESS

[75] Inventor: Takeshi Nishiguchi, Kyoto, Japan

[73] Assignee: Nishihara Environmental Sanitation Research Corporation Limited, Tokyo, Japan

[21] Appl. No.: 626,385

[22] Filed: Dec. 12, 1990

Related U.S. Application Data

[63] Continuation of Ser. No. 202,807, Jun. 3, 1988, abandoned.

[30] Foreign Application Priority Data

Jul. 31, 1987 [JP] Japan .................. 62-192242

[51] Int. Cl.$^5$ .............................. C02F 3/30
[52] U.S. Cl. ............... 210/614; 210/630; 210/631; 210/717; 210/906
[58] Field of Search ............ 204/149; 210/605, 631, 210/702, 717, 906, 907, 614, 630

[56] References Cited

U.S. PATENT DOCUMENTS

3,926,754 12/1975 Lee ........................ 204/149
4,029,575 6/1977 Bykowski et al. ........... 210/605

*Primary Examiner*—Ivars Cintins
*Attorney, Agent, or Firm*—Scully, Scott, Murphy, Presser

[57] ABSTRACT

A waste water treatment process wherein an iron contactor or iron contactors are immersed in a treatment tank, into which waste water flows. In the treatment tank sulfate reducing bacteria are made to coexist with activated sludge or biofilters, wherein a velocity of flow of agitating stream on the outer surfaces of said iron contactor or contactors is set at 10 to 20 cm/sec, under an aerobic treatment. Iron ions are made to elute from said iron contactor or contactors by utilizing electrochemical iron corrosion through the agency of oxygen concentration cells on the outer surfaces of said iron contactor or contactors on conditions that dissolved oxygen concentration in the treatment tank is 1 to 3.2 mg/l and the oxidation-reduction potential is $-200$ to $-400$ millivolts (mV). Under an anaerobic treatment, iron ions are made to elute by utilziing microorganism-corrosion on the outer surfaces of said iron contactor or contactors on condition that dissolved oxygen concentration in the treatment tank is 0 mg/l. Under the aerobic or anaerobic conditions, the iron ions eluting from the outer surfaces of said iron contactor or contactors are combined with ions of phosphoric acid in the waste water to thereby remove phosphorus in the waste water as insoluble salt of iron phosphate.

4 Claims, 4 Drawing Sheets

LOAD OF PHOSPHORUS WITH RESPECT TO THE SURFACE AREA OF THE STEEL CONTACT MATERIAL

FIG.6

WASTE WATER TREATING PROCESS

This application is a continuation of application Ser. No. 202,807, filed on June 3, 1988, now abandoned.

FIELD OF THE INVENTION

The present invention relates to a process of treating waste water by an activated sludge and a biofilter process. Furthermore, the present invention relates to processes of treating waste water by activated sludge processes including a conventional activated sludge process, an extended aeration process, an intermittent cyclic aeration recess, a lagoon process, an oxidation ditch process and the like, and to processes of treating waste water by biofilter processes including a contact aeration process, a rotating biological contactor process, a fluidized bed process and the like wherein dephosphorization, i.e. removal of phosphorus is performed, and more particularly to the waste water treatment process by activated sludge process or the biofilter process wherein phosphorus in the waste water is removed or phosphorus and nitrogen in the waste water are removed in the present of iron ions.

BACKGROUND OF THE INVENTION

Recently, as a countermeasure against the eutrophication of lakes, ponds and the like, it has become necessary to remove from the waste water phosphoric acids such as polyphosphoric acid, orthophosphoric acid, methaphosphoric acid, pyrophosphoric acid and the like or salts thereof and nitrogen before the waste water is expelled into these bodies of water.

In order to effect dephosphorization, prior art methods have included coagulation and sedimentation processes, biological dephosphorization processes, crystallization-dephosphorization processes, and the like. Since denitrification is also desired, a biological denitrification process has been widely practiced.

The above-described processes of dephosphorization, although having some success, also are plagued with drawbacks. In the coagulation and sedimentation process, stability in the treatment of dephosphorization can be obtained, however, it is difficult to feed a coagulant at a suitable flow rate, whereby a large quantity of the coagulant is needed. Consequently, running cost is high, the operational control becomes troublesome, and further, production of sludge is increased and dewaterability is worsened.

Furthermore, although biological dephosphorization by activated sludge processes or biofilter processes, is seemingly economical due to fluctuations in the flow rate of the waste the process becomes inefficient when the flow rate of waste water varies. Furthermore, in order to prevent phosphorus from being released again from the microorganisms in the excess sludge, chemically coagulated dephosphorization is necessary, thus the treatment process becomes complicated and uneconomical. Furthermore, when the nitrification treatment is combined with the above discussed processes, the dephosphorization rate is adversely affected by the conditions of the denitrification treatment; thus the dephosphorization treatment becomes unstable.

Further, in connection with the crystallization-dephosphorization process, many conditions such as decarbonation and pH control are required in order to provide an effective treatment. The processes are cost and labor intensive.

The present invention contemplates solving the problems concerning dephosphorization, or dephosphorization and denitrification by performing the activated sludge processes including the conventional activated sludge process, the extended aeration process, the intermittent cyclic aeration process, the lagoon process, the oxidation ditch process and the like, and also performing the waste water treatment processes by the biofilter processes including the rotating biological contactor process, the contact aeration process, the fluidized bed process and the like.

SUMMARY OF THE INVENTION

An object of the present invention is to provide a waste water treatment process such as an activated sludge process or a biofilter process, wherein the stability of an electrochemical dephosphorization process and the economics of a biochemical dephosphorization process are combined together. It is a further object of the invention to provide an effective dephosphorization performed by electrochemical and biochemical reaction wherein stable denitrification can be performed simultaneously with the dephosphorization.

More specifically, the present invention features a waste water treatment process wherein, an iron contactor or iron contactors are immersed in a treatment tank, into which waste water flows. In the treatment tank sulfate reducing bacteria are made to coexist with activated sludge or biofilters, wherein a velocity of flow of agitating stream on the outer surfaces of iron contactor or contactors is set at 10 to 20 cm/sec, under the aerobic treatment. Iron ions are made to elute from the iron contactor or contactors by utilizing electrochemical iron corrosion through the agency of oxygen concentration cells on the outer surfaces of the iron contactor or contactors on conditions that dissolved oxygen concentration in a treatment tank is 1 to 3.2 mg/l and the oxidation-reduction potential is $-200$ to $-400$ mV. Under the anaerobic treatment, iron ions are made to elute by utilizing microorganism-corrosion on the outer surfaces of the iron contactor or contactors on condition that dissolved oxygen concentration in the treatment tank is 0 mg/l. Under the aerobic or anaerobic conditions, the iron ions eluting from the outer surfaces of the iron contactor or contactors are combined with ions of phosphoric acid in the waste water to thereby remove phosphorus in the waste water as insoluble salt of iron phosphate.

According to the present invention the iron contactor or contactors may be formed of iron plate members, iron granular members, iron net members, iron tube members, iron bar members, iron disc members and the like. Elution of the iron ions is proportional to the surface area of the iron contactor or contactors. As the iron contactor, it is preferable to use a contactor having a contacting surface area as large as possible.

Further, as for the immersed position of the iron contactor or contactors, in the activated sludge process, it is preferable to immerse the contactor or contactors at a portion where the dissolved oxygen concentration is in the range of 1 to 3.2 mg/l. Furthermore, in the biofilter process, since a multiple stage system is normally adopted, it is preferable to immerse the contactor or contactors in a first tank and the like where the dissolved oxygen concentration is in a range of 1 to 2.5 mg/l.

Figure 6:
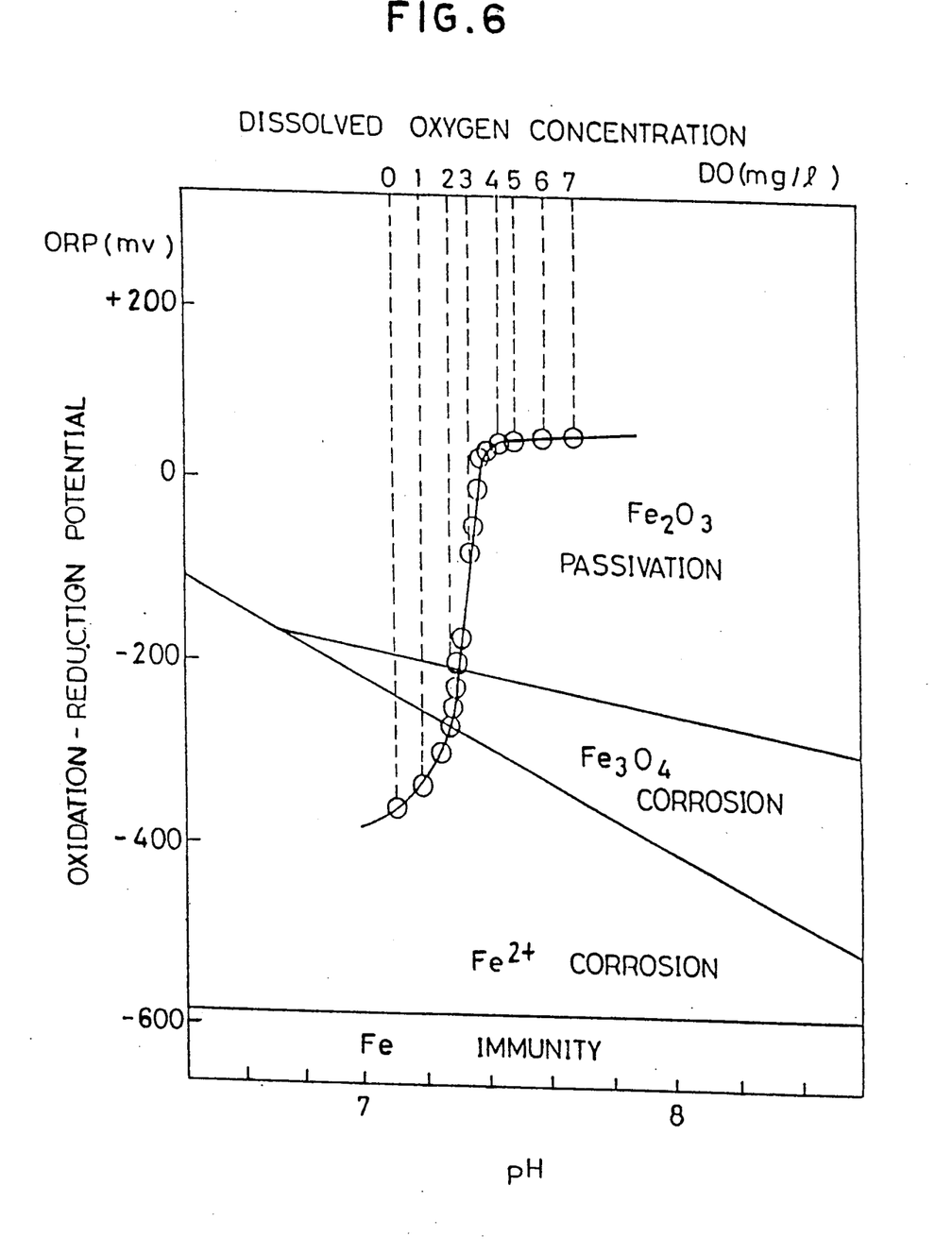
FIG. 6 is the Fe-$H_2O$ system Pourbaix diagram together with the curve showing values of DO plotted against oxidation-reduction potential in said diagram.

According to the present invention, it is necessary to immerse the iron contactor or contactors in a region where the condition of iron corrosion becomes optimal, and the dissolved oxygen concentration and the oxidation reduction potential are determined, evading the passivation region of iron as illustrated in the Fe-H$_2$O system Pourbaix diagram quoted from "DELTOMBE, E, and Pourbaix, M. CITE 6, 1954, Butterworths, London (1955) [P118]" together with the curve showing values of DO plotted against oxidation reduction potential in said diagram, shown in FIG. 6. Hence, under the aerobic treatment, as the optimum conditions of iron ion elution by corrosion, the effect shown by combining the dissolved oxygen concentration which is set at 1 to 3.2 mg/l and the oxidation reduction potential which is set at −200 to −400 mV is given. When the above conditions are out of this range, the iron enters the passivation region as shown in FIG. 6, where coatings of iron oxide are disadvantageously formed thereon, whereby the elution of iron ions is remarkably decreased. Under the anaerobic treatment, the sulfate reducing bacteria, which are made to coexist with the activated sludge or the biofilters, are actively utilized. Under a no oxygen state, the sulfate reducing bacteria of $10^5$ and $10^6$ cells/ml are made to coexist, so that the iron ions can be made to elute by microorganism-corrosion.

Here, the load of phosphorus to the surface area of the iron contactor or contactors is set within a range of 0.3 to 1.0 g/m$^2$/day, so that phosphorus can be effectively removed.

According to the present invention, to facilitate the elution of iron ions by the corrosion of the iron, the sulfate reducing bacteria having a concentration higher than the original concentration in the activated sludge or the biofilters, preferably $10^5$ to $10^6$ cells/ml for example, are made to coexist with the iron contactor or contactors, the activated sludge, or the biofilters.

For this purpose, particularly, the sulfate reducing bacteria are preferably acclimatized to a full extent. For example, since a large quantity of the sulfate reducing bacteria exist in the soil of a paddy field or the like in the first stage of the operation, it is preferable to mix the bacteria into the treatment tank and so forth to thereby acclimate the bacteria.

When the agitating flow velocity on the outer surfaces of the iron contactor or contactors is not proper, chemical compounds such as salt of ferric phosphate and calcium phosphate are crystallized on the outer surfaces of the iron contactor or contactors to form coating films, whereby the eluting reaction of the iron ions is impeded. Hence, the agitating flow velocity on the outer surfaces of the iron contactor or contactors is set at 10 to 20 cm/sec, whereby corrosion is furthered to make the iron ions easily elute, and the iron ions and ions of phosphoric acid in the waste water quickly react to each other to facilitate the production of insoluble salt of iron phosphate.

The conditional range of the concentration of the suspended solids in the mixed liquor in the treatment tank of the activated sludge process according to the present invention is 3000 to 6000 mg/l. In the cases other than this conditional range, it is necessary to regulate such that the suspended solids in the mixed liquor should be eliminated from the system as excess biological sludge and so forth, so that the concentration of suspended solids in the mixed liquor can be included within the conditional range.

According to the present invention, while the iron contactor or contactors immersed in the treatment tank and the sulfate reducing bacteria are made to coexist with each other and the agitating flow velocity is set within the range of 10 to 20 cm/sec, under optimal corrosion conditions of the iron contactor or contactors, elution of the iron ions suitable for the reaction is performed by corrosion through the agency of the oxygen concentration cells under the aerobic treatment and by the microorganism-corrosion under the anaerobic treatment. The iron ions and the ions of phosphoric acid in the waste water react to each other to form an amorphous of salt of ferric phosphate, which is settled with the sludge, whereby dephosphorization in the waste water is performed.

Particularly, in the biofilter process such as the rotating biological contactor process, the contact aeration process and the fluidized bed process, when the biofilters on the outer surfaces of the iron contactor or contactors immersed in the first tank or the like are thin, the iron ions are made to elute by the corrosion phenomenon through the agency of the oxygen concentration cells under the aerobic treatment. When the biofilters become thick, the biofilters on the outer surfaces of the iron contactor or contactors are brought into the anaerobic condition, whereby the microorganism-corrosion by the sulfate reducing bacteria occurs on the outer surfaces of the iron contactor or contactors, whereby the iron ions are made to elute.

In a case like this, when the sulfate reducing bacteria of $10^5$ to $10^6$ cells/ml coexist, three times or more iron ions elute as compared with the case where the sulfate reducing bacteria do not coexist.

The iron ions which elute as described above are combined with the ions of phosphoric acid in the waste water which flows into the treatment tank to form the insoluble salt of ferric phosphate that is taken into the sludge. Hence, in the activated sludge process, cohesiveness of the sludge is raised, and, in the biofilter process, cohesiveness of the sloughed off biofilm is raised, whereby the settability of the sludge is improved. Accordingly, the concentration of the suspended solids in the mixed liquor in the treatment tank can be raised as compared with the conventional biological treatment process, whereby a shock-absorbing force against the fluctuations in the influent condition is strong, so that a stable treating function can be maintained.

Furthermore, where an aeration step and a non-aeration step are repeated, dephosphorization and nitrification-denitrification can be performed at the same time as in the intermittent cyclic aeration process. The iron ions eluting into the waste water control the consumption of the alkalinity, thus holding pH within the optimal range of nitrification-denitrification favorably, nitrification-denitrification can be facilitated, so that, according to the invention, not only dephosphorization but also denitrification can be improved to a considerably extent.

According to the present invention, while an iron contactor or contactors are immersed in a treatment tank, sulfate reducing bacteria are made to coexist, and a velocity of flow of agitating stream is rendered to the outer surfaces of the iron contactor or contactors, concentration of dissolved oxygen or oxidation-reduction potential is controlled to hold the optimal condition of corroding the iron, and iron ions are made to elute into the mixed liquor in the treatment tank, under the aerobic treatment, by electrochemical corrosion through the agency of oxygen concentration cells, and under the anaerobic treatment, by microorganism-corrosion by use of the sulfate reducing bacteria, so that ions of phosphoric acid in the waste water are combined with the eluting iron ions to form an amorphous of an insoluble salt of iron phosphate, which does not easily elute again. Because of this, in contrast to the dephosphorization rate by the conventional activated sludge processes or the biofilter processes is 0 to 30%, 80 to 95% can be achieved by the waste water treatment processes according to the present invention, whereby the dephosphorization rate is improved to a considerable extent, so that a remarkable difference in effect is proved. Particularly, even if the excess sludge is placed under the anaerobic condition phosphorus does not elute from the excess activated sludge. This is unlike conventional biological dephosphorization processes. Therefore, problems caused by the conventional processes are solved, so that stable and highly efficient dephosphorization effects can be achieved.

Furthermore, according to the present invention, since the agitating velocity of flow on the outer surface of the iron contactor or contractors is made to be within the range of 10 to 20 cm/sec, corrosion on the outer surfaces of the iron contactor or contactors is facilitated, elution of the iron ions is furthered and opportunities for the iron ions to combine with the ions of phosphoric acid in the waste water are increased. Hence, effective reaction is effected to produce insoluble salt of iron phosphate, so that the dephosphorization rate can be remarkably high and stabilized.

Further, in order to perform dephosphorization in the waste water by use of salt of iron according to an ordinary coagulation and sedimentation process, it is necessary to use 3 to 5 times the theoretically necessary value. However, according to the present invention, under the controlled optimal conditions, the iron ions are made to elute by corrosion, and, immediately and effectively made to react to the ions of phosphoric acid in the waste water, so that such advantages are offered that the necessary value of the iron ions can be satisfied by the substantially theoretical value. The operation is economical and easy, and concentratability of the sludge is satisfactory, whereby the quantity of the excess sludge is decreased.

Since, with the excess biological sludge according to the present invention, elution of phosphorus and the like do not easily occur again, the content of phosphorus in the excess sludge according to the present invention is 3.0% or thereabove. This is in contrast to the content of phosphorus in the excess sludge according to the conventional processes, for example, in the dried sludge, is 1.0 to 1.5%. Hence when utilized in the agricultural industry, the present invention can provide an excellent sludge fertilizer having a high-phosphorus content.

Furthermore, with the waste water treatment system according to the conventional activated sludge processes and biofilter processes, the technique of operational control in accordance with the variation in the influent condition is difficult to apply. Thus, the dephosphorization rate fluctuates and it is difficult to expect a stable dephosphorization rate. However, according to the present invention, the dephosphorization treatment can be reliably performed by the operation within the optimal range.

According to the waste water treatment process of the present invention, the operation is performed at a lower concentration of dissolved oxygen in the treatment tank than that of the conventional processes, so that energy-saving can be expected. Additionally, this is the waste water treatment process wherein both the dephosphorization and denitrification can be expected from the aeration step and the non-aeration step as aforesaid.

BRIEF DESCRIPTION OF THE DRAWINGS

One example of the specific forms of the present invention will hereunder be described with reference to the accompanying drawings. However, the present invention need not necessarily be limited to the following description and exemplification.

DESCRIPTION OF THE PREFERRED EMBODIMENT

Figure 1:
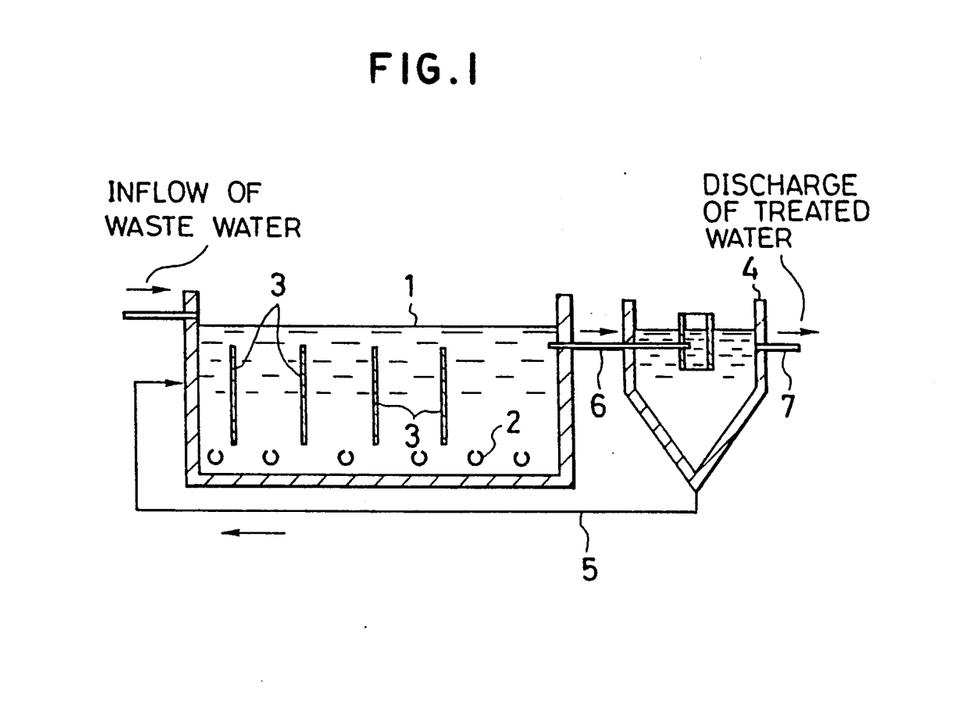
FIG. 1 is a schematic flow chart showing the waste water treatment system of the activated sludge process by the extended aeration process according to one embodiment of the present invention.

In FIG. 1, designated at 1 is a treatment tank for holding the activated sludge, 2 is an aeration device provided at an inner bottom portion of the treatment tank 1, and 3 is a plurality of flat steel plate contactors immersed in the treatment tank at suitable intervals. Denoted at 4 is a settling tank for solid-liquid-separating the mixed liquor in the treatment tank 1, 5 is a sludge return pipe for returning the settled sludge in the settling tank 4 to an inlet portion of the treatment tank 1, 6 is a transfer pipe for transferring the mixed liquor in the treatment tank 1 to the settling tank, and 7 is a discharge pipe for discharging supernatant liquid of the settling tank.

Removed from the waste water, which has flowed into the treatment tank 1, are phosphorus, BOD, COD, and SS (suspended solids) in a unit wherein the contents of the treatment tank 1 and the settling tank 4 are combined with each other. In the settling tank 4, the mixed liquor is settled and separated into the supernatant liquid and the sludge, and the supernatant liquid is discharged from the discharge pipe 7. The biological sludge settled and separated in the settling tank 4 is returned to the treatment tank 1, and part of the biological sludge is suitably extracted from the system as the excess biological sludge, whereby the concentration of the suspended solids in the mixed liquor in the treatment tank 1 is held properly.

Comparative experiments on the dephosphorization were conducted by use of the treatment unit of the activated sludge process by the extended aeration process according to one embodiment of the present invention.

When the suspended solids concentration in the mixed liquor is set at 3400 mg/l, the number of the sulfate reducing bacteria set at $3 \times 10^5$ cells/ml, the velocity of flow of agitating stream in the neighborhood of the outer surface of the flat steel plate contactor or contactors in the waste water inlet part set at 12 cm/sec, the dissolved oxygen concentration at 2.0 mg/l and the oxidation-reduction potential at -240 mV, if not using the flat steel plate contactors, the dephosphorization rate is 0 to 8%. On the other hand, in case of immersing the flat steel plat contactors, the dephosphorization rate if 95%, cohesiveness of the activated sludge is improved, the removal rates of BOD, COD and SS are considerably raised and the transparency reaches 50° or thereabove, thus achieving satisfactory results. In the extended aeration process, if the flat steel plate contactors are not immersed for use as in this example, then, the satisfactory dephosphorization rate cannot be expected and remarkable improvements in the treated water quality cannot be expected.

Figure 2:
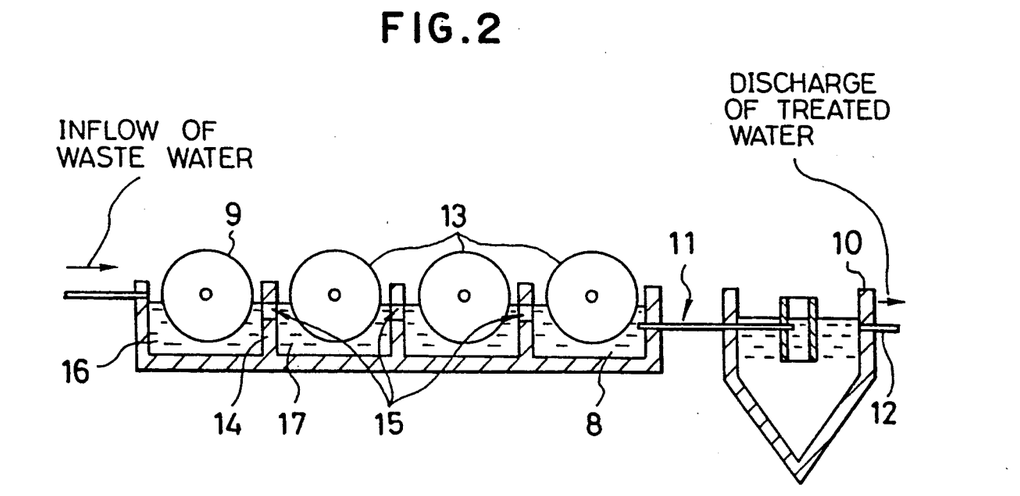
FIG. 2 is a schematic flow chart showing the waste water treatment system of the biofilter process by the rotating biological contactor process according to another embodiment.

In FIG. 2, designated at 8 is a rotating biological contactor treatment tank, 9 is a steel rotating biological contactors immersed in the treatment tank 8, 10 is a settling tank, 11 is a transfer pipe for transferring the mixed liquor in the rotating biological contactor treatment tank 8 into the settling tank 10, 12 is a discharge pipe for discharging the supernatant liquid in the settling tank 10, 13 represents plastic contactors immersed in the rotating biological contactor treatment tank 8, 14 represents partition walls of the rotating biological contactor treatment tank 8, and 15 represents communicating holes formed in the partition walls 14. Removed from the waste water, which has flowed into the rotating biological contactor treatment tank 8, are phosphorus, BOD, COD and SS in a unit wherein the rotating biological contactor treatment tank 8 and the settling tank 10 are combined with each other. In the settling tank 10, the mixed liquor is settled and separated into the supernatant liquid and the sludge, and the supernatant liquid is discharged from the discharge pipe 12.

In the embodiment of the present invention, with the treatment unit of the biofilter process by the rotating biological contactor process, when the concentration of phosphorus in the influent water is 4 to 16.9 mg/l, such results were obtained that the dephosphorization rate was 90% or thereabove and the concentration of phosphorus in the treated water was constantly 1 mg/l or therebelow. At this time, the surface area of the steel rotating biological contactors, about ½ of the outer surfaces of which were immersed in a first tank 16 of the rotating biological contactor treatment tank 8, was set at 0.48 m² (ten sheets), the surface area of the plastic rotating biological contactors which were immersed in a second tank 17 and so forth of the rotating biological contactor treatment tank 8 was set at 1.44 m² (30 sheets) and the RPM of the rotating biological contactors were set at 20 cycles/min. At this time, the concentration of dissolved oxygen in the neighborhood of the surface of the rotating biological contactors in the waste water inlet part of the first tank was 2.2 mg/l, the oxidation-reduction potential -330 mV, the number of the sulfate reducing bacterial $7 \times 10^5$ cells/ml and the flow rate of the influent water 20 l/day. In this embodiment, four rotating biological contactor treatment tanks were provided, particularly about ½ of the surface area of the steel rotating biological contactors was immersed in the first tank at the former stage, and the plastic rotating biological contactors were immersed in the other three tanks at the latter stage. However, the number of tanks, in which the steel rotating biological contactors are immersed and the number of sheets of the contactors can be suitably increased or decreased.

Further, another waste water treatment system for working the processes according to the present invention will hereunder be described.

Figure 3:
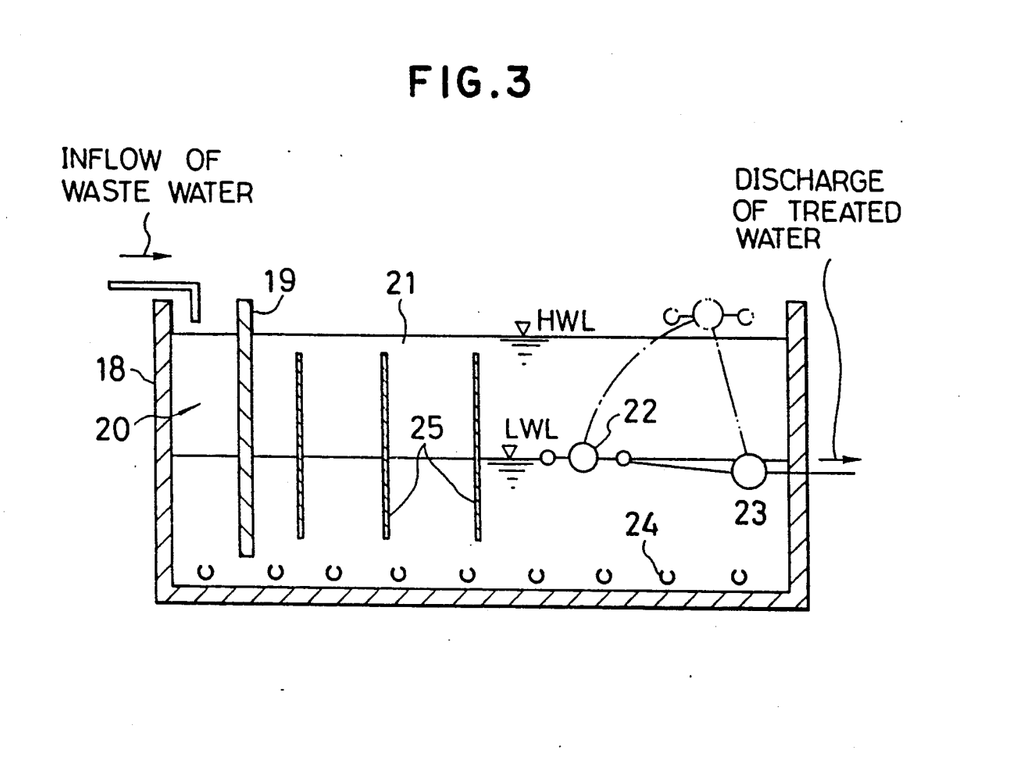
FIG. 3 is a schematic flow chart showing the waste water treatment system of the intermittent cyclic aeration process according to a further embodiment.
Figure 4:
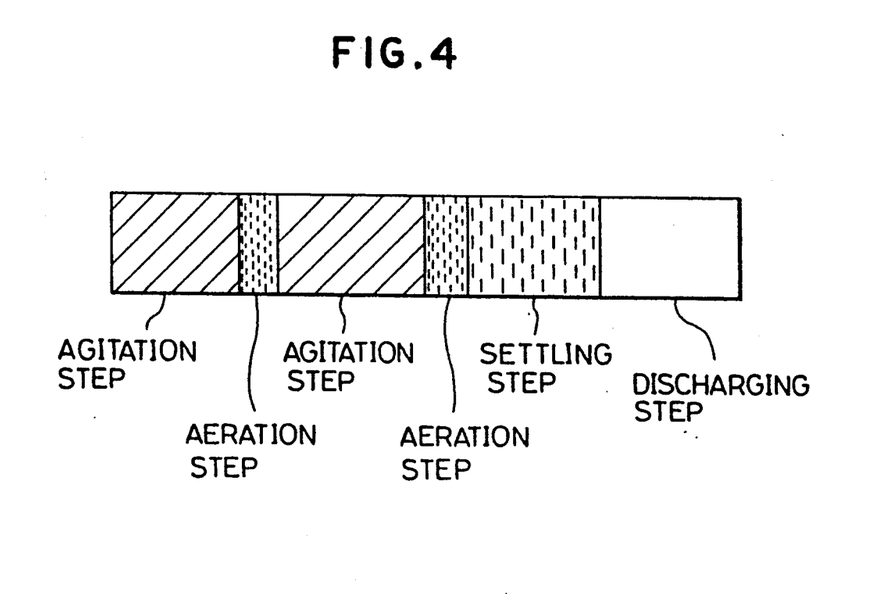
FIG. 4 is a chart showing various steps of the waste water treatment system wherein denitrification and dephosphorization are simultaneously performed as shown in FIG. 3.

In FIG. 3, designated at 18 is a treatment tank for holding the activated sludge. A baffle board 19 partitions between an inlet zone 20, into which the waste water flows, and a waste water treatment zone 21. Denoted at 22 is a supernatant liquid discharge device which is vertically movably provided at the end portion on the discharge side of the treatment tank 18 through a pivot 23, and the supernatant liquid discharge device 22 is lowered together with the liquid level, while discharging the supernatant liquid during a discharging step. Designated at 24 is an aeration device provided at the bottom portion of the treatment tank 18. In this embodiment, a jet aeration device for blowing a gas-liquid mixed liquor out is not easily clogged and can perform agitation by blowing out the mixed liquor in the treatment tank, whereby the jet aeration device is used as the aeration device 24. Denoted at 25 are flat steel plate contactors immersed in the treatment zone 21 in the treatment tank 18 at suitable intervals. As shown in FIG. 4, the treatment tank 18 is operationally controlled to successively repeat an agitation step, aeration step, settling step and discharging step.

First, the waste water is made to flow into the inlet zone 20 in the treatment tank 18. Removed from the waste water which is made to flow into the treatment tank 18 are phosphorus, BOD, COD, SS and nitrogen. In the agitation step, the content of the treatment tank 18 is brought into the anaerobic condition, while in the aeration step, air is fed from the aeration device 24 to the treatment tank 18, whereby the content of the treatment tank 18 is brought into the aerobic condition.

Then, in the settling step, the suspended solids in the mixed liquor are settled in the treatment tank 18, and, in the succeeding discharging step, the supernatant liquid is discharged from the supernatant liquid discharge device 22. And, the excess biological sludge is suitably extracted, so that the concentration of the suspended solids in the lower rows of the mixed liquid can be held properly.

The experimental results as shown in the lower rows of the following Table 1 were obtained by the treatment system of the intermittent cyclic aeration process according to one embodiment of the present invention as shown in FIG. 3 when the dissolved oxygen concentration in the neighborhood of the outer surface of the flat steel plate contactor or contactors and the oxidation-reduction potential were set as shown in the upper rows of TABLE 1. At this time, the aeration step was 30 min, the non-aeration step one hour, the concentration of the suspended solids in the mixed liquor was 5100 mg/l, the number of the sulfate reducing bacteria $8 \times 10^5$ cells/ml, and the velocity of flow of agitating flow on the outer surface of the flat steel plate contactor or contactors was 12 cm/sec.

TABLE 1

| ITEM | (1) | (2) |
| --- | --- | --- |
| DISSOLVED OXYGEN CONCENTRATION (mg/l) | 1.9 | 2.4 |
| OXIDATION- | -310 | -200 |

TABLE 1-continued

| ITEM | (1) | (2) |
|---|---|---|
| REDUCTION POTENTIAL (mV) | | |
| PHOSPHORUS (total phosphorus) | | |
| Influent (mg/l) | 4.24 | 3.52 |
| Effluent (mg/l) | 0.33 | 0.20 |
| NITROGEN (total nitrogen) | | |
| Influent (mg/l) | 32.5 | 40.5 |
| Effluent (mg/l) | 1.4 | 3.8 |

As shown in Table 1, the dephosphorization rate and the denitrification rate were 90% or thereabove, respectively, depending upon the combined effect of the coexistence of the sulfate reducing bacteria, the velocity of flow of agitation stream, the dissolved oxygen concentration and the oxidation-reduction potential, thus achieving the outstanding treating results. At the same time, good results were obtained in that the removal rates of BOD, COD and SS were high and the transparency was 100° or thereabove.

Figure 5:
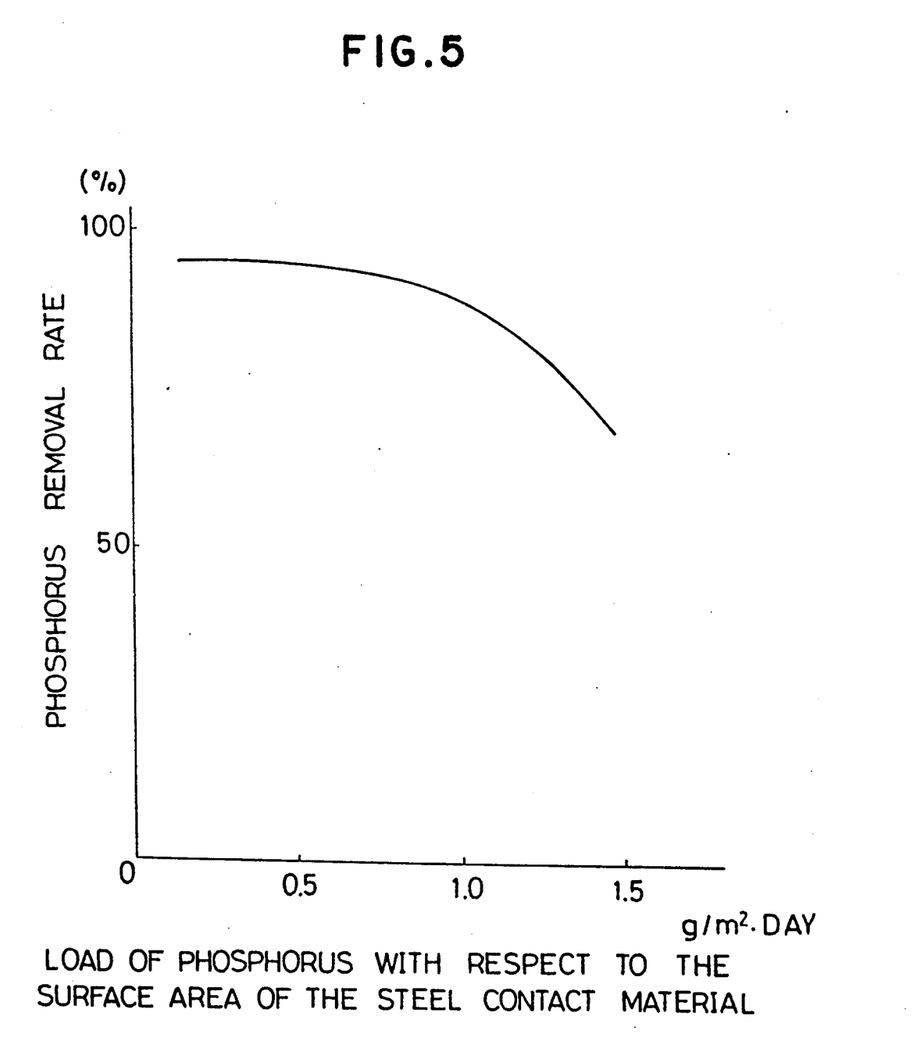
FIG. 5 is a chart showing the relationship between the load of phosphorus to the surface area of the flat steel plate contactor or contactors and the dephosphorization rate.

Furthermore, FIG. 5 shows the results of that the number of sheets of the flat steel plate contactors immersed in the treatment tank was varied and the relationship between the load of phosphorus to the surface area of the flat steel plate contactors and the dephosphorization rate of 90% of thereabove was studied. It is found from this that, in order to perform the stable dephosphorization, it is necessary to hold the load of phosphorus to the surface area of the flat steel plate contactors within a range of 0.3 to 1.0 g/m²/day.

Incidentally, when the load of phosphorus to the surface area of the flat steel plate contactors was in the proximity of 0.1 g/m²/day, the elution value of the iron ions became excessively high, and the excessively eluting iron ions were turned into $FeO_3$, whereby sometimes, the treated water assumed slightly yellowish color.

As the embodiments of the present invention have been shown the waste water treatment system of the extended aeration process, the rotating biological contactor process and the intermittent cyclic aeration process have been effective. However, in addition to the above, the present invention can be worked by the activated sludge processes including the conventional activated sludge process, the lagoon process, the oxidation ditch process and the like, and the biofilter processes such as the contact aeration process and the fluidized bed process.

I claim:

1. In a waste water treatment process employing activated sludge or biofilters in aerobic conditions, and then, anaerobic conditions to treat waste water containing phosphate ions, the improvement which comprises:
    a. adding activated sludge and sulfate reducing bacteria to the waste water, and immersing an iron contactor in waste water containing phosphate ions flowing into a waste water treatment tank;
    b. causing an agitating stream of the waste water to flow over the surface of the iron contactor or contactors at a velocity of 10 to 20 cm/sec.;
    c. under aerobic conditions, providing a dissolved oxygen concentration of 1 to 3.2 mg/l and a redox potential within the range from 31 200 to −400 mV to effect corrosion on the surface of said iron contactor, and cause iron ions to elute from said iron contactor;
    d. then under anaerobic conditions, holding the dissolved oxygen concentration at 0 mg/l in the treatment tank, the sulfate reducing bacteria acting on the surface of the iron contactor to cause corrosion on the surface of the iron contactor, and eluting iron ions from the iron contactor; and
    e. said iron ions eluted from the surface of the iron contactor under said aerobic and said anaerobic conditions, reacting with phosphoric acid ions in the waste water to produce insoluble compounds formed of iron and phosphate ions, and removing said compounds of iron and phosphate ions from the waste water.

2. A process according to claim 1 wherein the ratio of the phosphate flow rate into the treatment tank to the surface area of the iron contactor is in the range of 0.3 to 1.0 g/m² day and the phosphorus removal is at least 90% wherein the total quantity of phosphorus in said waste water containing phosphate ions is measured to determine the phosphate content of said waste water and to determine said phosphate flow rate range.

3. A process according to claim 1 wherein the sulfate reducing bacteria concentration is $10^5$ to $10^6$ cells/ml.

4. A process according to claim 1 wherein the iron contactor is in the form of an iron plate, iron granules, an iron net, an iron tube, an iron bar or an iron disc.

* * * * *

UNITED STATES PATENT AND TRADEMARK OFFICE
CERTIFICATE OF CORRECTION

PATENT NO. : 5,098,567
DATED : March 24, 1992
INVENTOR(S) : Takeshi Nishiguchi It is certified that error appears in the above-identified patent and that said Letters Patent is hereby corrected as shown below:

In the Abstract, line 16:  "utilziing"  should read as --utilizing--
Column 10, line 18, Claim 1:  delete "31"

Signed and Sealed this

Third Day of August, 1993

Attest:

MICHAEL K. KIRK

*Attesting Officer*   Acting Commissioner of Patents and Trademarks